United States Patent
Elyashev et al.

(10) Patent No.: US 8,875,128 B2
(45) Date of Patent: Oct. 28, 2014

(54) CONTROLLING PERMISSIONS IN VIRTUALIZATION ENVIRONMENT USING HIERARCHICAL LABELING

(75) Inventors: Vitaly Elyashev, Ramat Gan (IL); Shahar Havivi, Ramat Gan (IL)

(73) Assignee: Red Hat Israel, Ltd., Raanana (IL)

(*) Notice: Subject to any disclaimer, the term of this patent is extended or adjusted under 35 U.S.C. 154(b) by 814 days.

(21) Appl. No.: 12/628,071

(22) Filed: Nov. 30, 2009

(65) Prior Publication Data

US 2011/0131572 A1 Jun. 2, 2011

(51) Int. Cl.
| | |
|---|---|
| *G06F 9/455* | (2006.01) |
| *G06F 15/173* | (2006.01) |
| *G06F 7/04* | (2006.01) |
| *G06F 17/30* | (2006.01) |
| *G06F 15/16* | (2006.01) |
| *H04L 29/06* | (2006.01) |
| *G06F 12/00* | (2006.01) |
| *G06F 12/14* | (2006.01) |
| *G06F 13/00* | (2006.01) |
| *G11C 7/00* | (2006.01) |

(52) U.S. Cl.
CPC .................................. *G06F 9/45533* (2013.01)
USPC ............ 718/1; 709/223; 709/224; 709/226; 726/2; 726/3; 726/4; 726/5; 726/6; 726/7; 726/17; 726/18; 726/21

(58) Field of Classification Search
USPC ................................ 718/1; 709/223, 224, 226
See application file for complete search history.

(56) References Cited

U.S. PATENT DOCUMENTS

| | | | |
|---|---|---|---|
| 8,065,714 B2 * | 11/2011 | Budko et al. | 726/4 |
| 2005/0132215 A1 * | 6/2005 | Wang et al. | 713/200 |
| 2006/0136910 A1 * | 6/2006 | Brickell et al. | 718/1 |
| 2006/0136911 A1 * | 6/2006 | Robinson et al. | 718/1 |
| 2007/0089111 A1 * | 4/2007 | Robinson et al. | 718/1 |
| 2007/0250833 A1 * | 10/2007 | Araujo et al. | 718/1 |
| 2008/0134176 A1 * | 6/2008 | Fitzgerald et al. | 718/1 |
| 2008/0148340 A1 * | 6/2008 | Powell et al. | 726/1 |
| 2008/0184225 A1 * | 7/2008 | Fitzgerald et al. | 718/1 |
| 2008/0301770 A1 * | 12/2008 | Kinder | 726/2 |
| 2009/0157881 A1 * | 6/2009 | Kavuri et al. | 709/226 |
| 2009/0178111 A1 * | 7/2009 | Moriconi et al. | 726/1 |
| 2009/0328170 A1 * | 12/2009 | Williams et al. | 726/7 |
| 2010/0162237 A1 * | 6/2010 | Babu B R et al. | 718/1 |
| 2010/0235825 A1 * | 9/2010 | Azulay et al. | 717/172 |
| 2010/0306764 A1 * | 12/2010 | Khanna | 718/1 |
| 2011/0209145 A1 * | 8/2011 | Chen et al. | 718/1 |

* cited by examiner

*Primary Examiner* — Charles Swift
(74) *Attorney, Agent, or Firm* — Lowenstein Sandler LLP

(57) ABSTRACT

A host controller associates each virtual machine with at least one label from a hierarchy of labels, where each label represents a distinct virtual machine parameter. The host controller also associates a user with one or more roles and with one or more labels from the hierarchy of labels, where each role defines at least one action permitted to be performed with respect to virtual machines. The host controller further facilitates control over user actions pertaining to virtual machines based on the roles and the labels associated with the user.

18 Claims, 12 Drawing Sheets

CONTROLLING PERMISSIONS IN VIRTUALIZATION ENVIRONMENT USING HIERARCHICAL LABELING

TECHNICAL FIELD

Embodiments of the present invention relate to virtual machines, and more specifically, to controlling permissions in virtualization environment using hierarchical labeling.

BACKGROUND

Virtualization allows multiplexing of the underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor or a host operating system. The hypervisor emulates the underlying hardware of the host computer, making the use of the virtual machine transparent to the guest operating system and the user of the computer.

Virtual machines can be provided by a centralized host that is coupled to multiple clients over a network. Each client can provide a virtual desktop environment indistinguishable from a physical desktop. A large organization with many different departments and multiple offices at various locations may have a system with thousands of virtual machines. Management of numerous virtual machines is a complex task that requires a large degree of system scalability.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for setting permissions in virtualization environment by means of hierarchical labeling. In one embodiment, servers hosting virtual machines are coupled to a host controller that associates virtual machines with labels representing distinct virtual machine parameters such as a geographic location of a virtual machine, a department of a virtual machine user, a technical characteristic of a virtual machine, etc. Labels may have hierarchical relationships. For example, location label "France" may be a parent of department labels "Human Resources," "Finance" and "Billing."

The host controller may also maintain multiple roles, where each role defines a set of allowed actions such as viewing virtual machines, adding virtual machines, editing virtual machines, etc. The host controller associates users with appropriate roles and labels. The host controller then uses these associations to facilitate control over user actions pertaining to virtual machines. For example, a specific user within a company may be associated with the role of a virtual machine manager to allow this user to add, delete and modify virtual machines. In addition, this user may be associated with labels "Finance" and "Billing" to permit the user to perform the above actions only with respect to virtual machines from the Finance and Billing departments.

Embodiments of the present invention provide an efficient mechanism for controlling user actions in a virtualization environment. With hierarchical labeling, permissions pertaining to virtual machines can be easily segregated based on various characteristics of the virtual machines, and without the need to define elaborate permission rules and execute complex queries to ensure the permission rules are satisfied.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
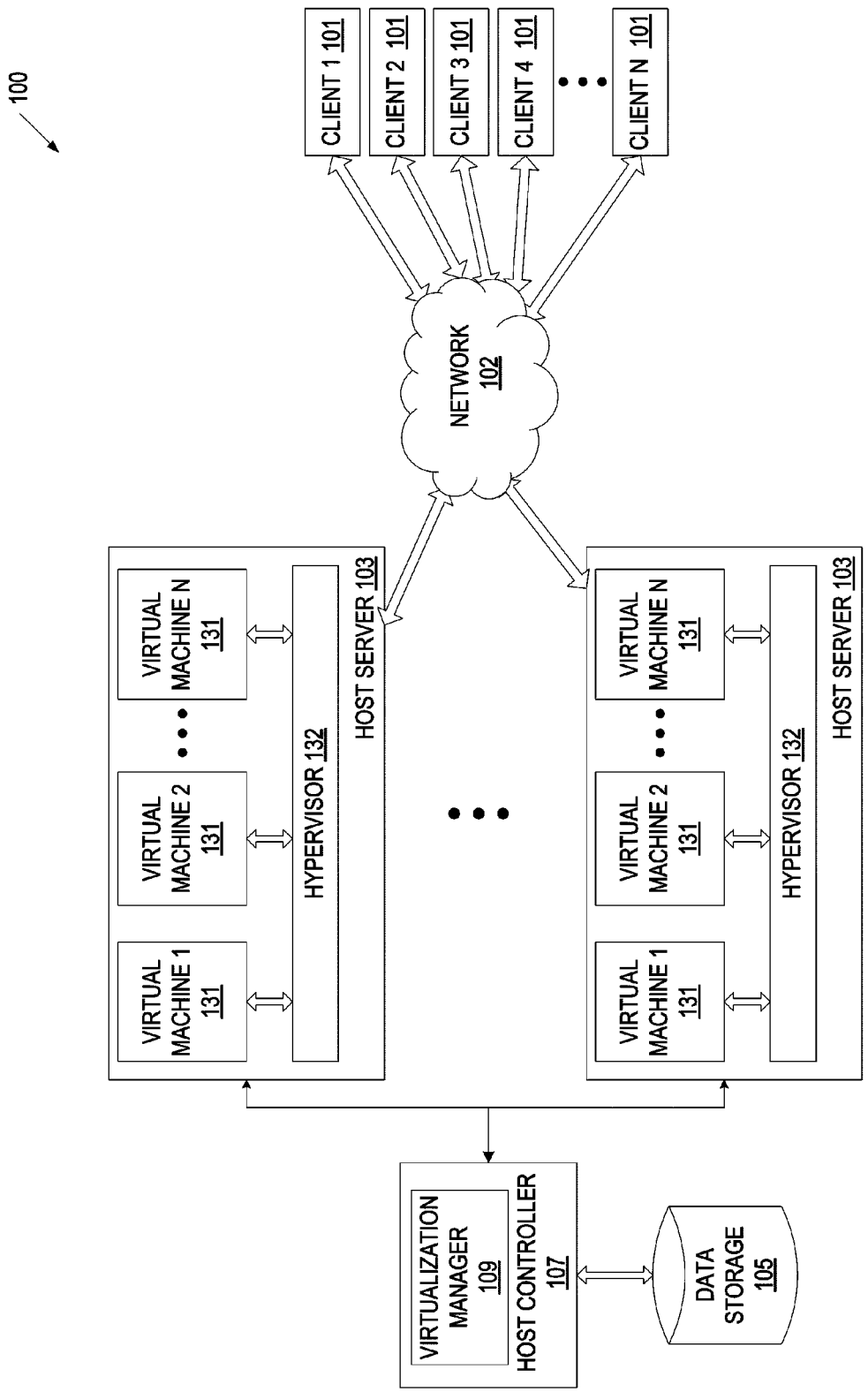
FIG. 1 illustrates an exemplary network architecture in which embodiments of the present invention may operate.

FIG. 1 illustrates an exemplary network architecture 100 in which embodiments of the present invention may operate. The network architecture 100 includes one or more host servers 103 coupled to clients 101 over a network 102. The network 102 may be a private network (e.g., a local area network (LAN), wide area network (WAN), intranet, etc.) or a public network (e.g., the Internet). The host servers 103 may also be coupled to a host controller 107 (via a network or directly). Host controller 170 may be an independent machine such as a server computer, a desktop computer, etc. Alternatively, the host controller 107 may be part of the host server 103.

In one embodiment, the clients 101 may include computing devices that have a wide range of processing capabilities. Some or all of the clients 101 may be thin clients, which serve as access terminals for users and depend primarily on the host servers 103 for processing activities. For example, the client 101 may be a desktop computer, laptop computer, cellular phone, personal digital assistant (PDA), etc. The client 101 may run client applications such as a Web browser. The client 101 may also run other client applications, which receive multimedia data streams or other data from the host server 103 and re-direct the received data to a local display or other user interface.

Host servers 103 may include server computers or any other computing devices capable of running one or more virtual machines 131. Each virtual machine 131 runs a guest operating system (OS) that may be different from one virtual machine to another. The guest OS may include Microsoft Windows, Linux, Solaris, Mac OS, etc. The host server 103 may include a hypervisor 132 that emulates the underlying hardware platform for the virtual machines 131. The hypervisor 132 may also be known as a virtual machine monitor (VMM), a kernel-based hypervisor or a host operating system.

Each virtual machine 131 can be accessed by one or more of the clients 101 over the network 102 and can provide a virtual desktop for the client(s) 101. From the user's point of view, the virtual desktop functions as a physical desktop (e.g., a personal computer) and is indistinguishable from a physical desktop.

The virtual machines 131 are managed by the host controller 107. The host controller 107 ensures that operations pertaining to individual virtual machines 131 are performed by appropriate users. For example, in an organization having offices in different geographic locations and a large number of virtual machines in each location, an IT director may be allowed to make any changes with respect to virtual machines 131 while a system administrator responsible for a specific office may only be allowed to administer virtual machines in this specific office. In addition, an office may have several departments, with each department having a designated IT technician allowed to oversee operation of virtual machines associated with the respective department.

In one embodiment, the host controller 107 includes a virtualization manager 109 that sets permissions for actions pertaining to various virtual machines 131 using hierarchical labeling. In particular, the virtualization manager 109 associates each virtual machine 131 with one or more labels representing distinct virtual machine parameters. For example, a virtual machine 131 may be associated with labels representing the geographic location of the virtual machine 131 such as a region label (e.g., Europe), a country label (e.g., France) and a city label (e.g., Paris). In addition, the virtual machine 131 may be associated with labels representing a positioning of a user of the virtual machine 131 within the organization (e.g., a department label, a group label, and a title label). The virtual machine 131 may also be associated with labels representing technical characteristics of a virtual machine (e.g., a memory allocation label, an operating system label, etc.), or with any other labels. The virtualization manager 109 stores associations between virtual machines 131 and respective labels in a database residing on a data storage device 105. In addition, the virtualization manager 109 assigns roles to various users and/or various groups of users, where each role defines a set of action permitted to be performed by a user or a group of users with respect to virtual machine. Further, the virtualization manager 109 associates the users and/or groups of users with respective labels to allow each user to perform actions only with respect to the virtual machines having the matching labels. The virtualization manager 109 stores associations of users and/or groups of users with respective roles and labels in the database residing on the data storage device 105. The data storage device 105 may share the machine with the host controller 107 (e.g., a disk drive in the host controller computer) or be an independent device coupled to the host controller directly or via a network (e.g., as a network-attached storage device (NAS)).

Figure 2:
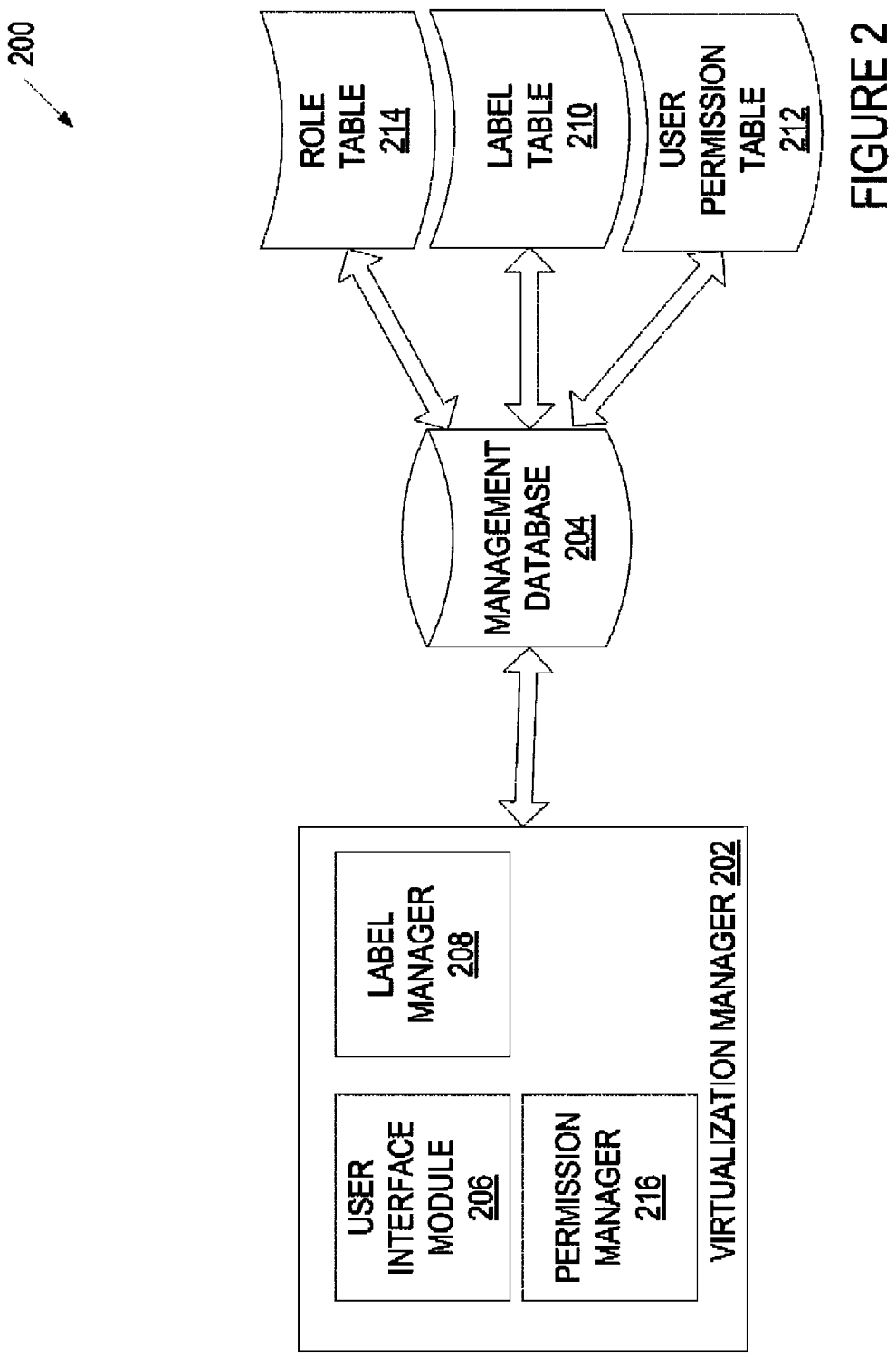
FIG. 2 is a block diagram of an embodiment of a permission control system.

FIG. 2 is a block diagram illustrating a permission control system (PCS) 200 in accordance with one embodiment of the present invention. The PCS 200 includes a virtualization manager 202, which may be similar to virtualization manager 109, and a management database 204, which may be hosted by data storage device 105.

The virtualization manager 202 may include a user interface module 206, a label manager 208 and a permission manager 216. The user interface module 206 may provide a labels user interface for specifying labels and hierarchical relationships between the labels. Each label may be an object having an identifier. For example, each label may be an object in the form of a file (e.g., a text file, a XML file, etc.).

The labeling hierarchy can be in the form of a tree where nodes represent labels and edges represent relationships between the labels. In particular, the top node in the tree can represent an organization label (e.g., a company, a university, a library, etc.). The organization label can have children labels such as a division label representing a division within the organization (e.g., Sony Ericsson, Sony Pictures Entertainment, etc.), a location label representing a geographic location (e.g., Europe, North America, Middle East, etc.), a technical component label representing a machine component type (e.g., hardware, operating system, application, etc.), etc. These labels may be in turn parents of other labels. For example, the division label can be a parent of department labels representing departments of virtual machine users within the division, with each department label being a parent of group labels representing groups of virtual machine users within the department. The location label can be a parent of country labels representing different countries, with each country being a parent of city labels. The technical component label can be a parent of technical characteristic labels representing specific technical characteristics of a virtual machine (e.g., a memory allocation parameter, a graphics parameter, etc.).

The labeling hierarchy provides an easy and convenient way of tagging virtual machines with a wide variety of labels and defining relationships between these labels. Associations between the labels and respective virtual machines are stored in the management database 240 (e.g., label table 210) using identifiers of virtual machines and identifiers of labels. An exemplary labels user interface will be discussed in more detail below in conjunction with FIGS. 4C and 4D.

Figure 4A:
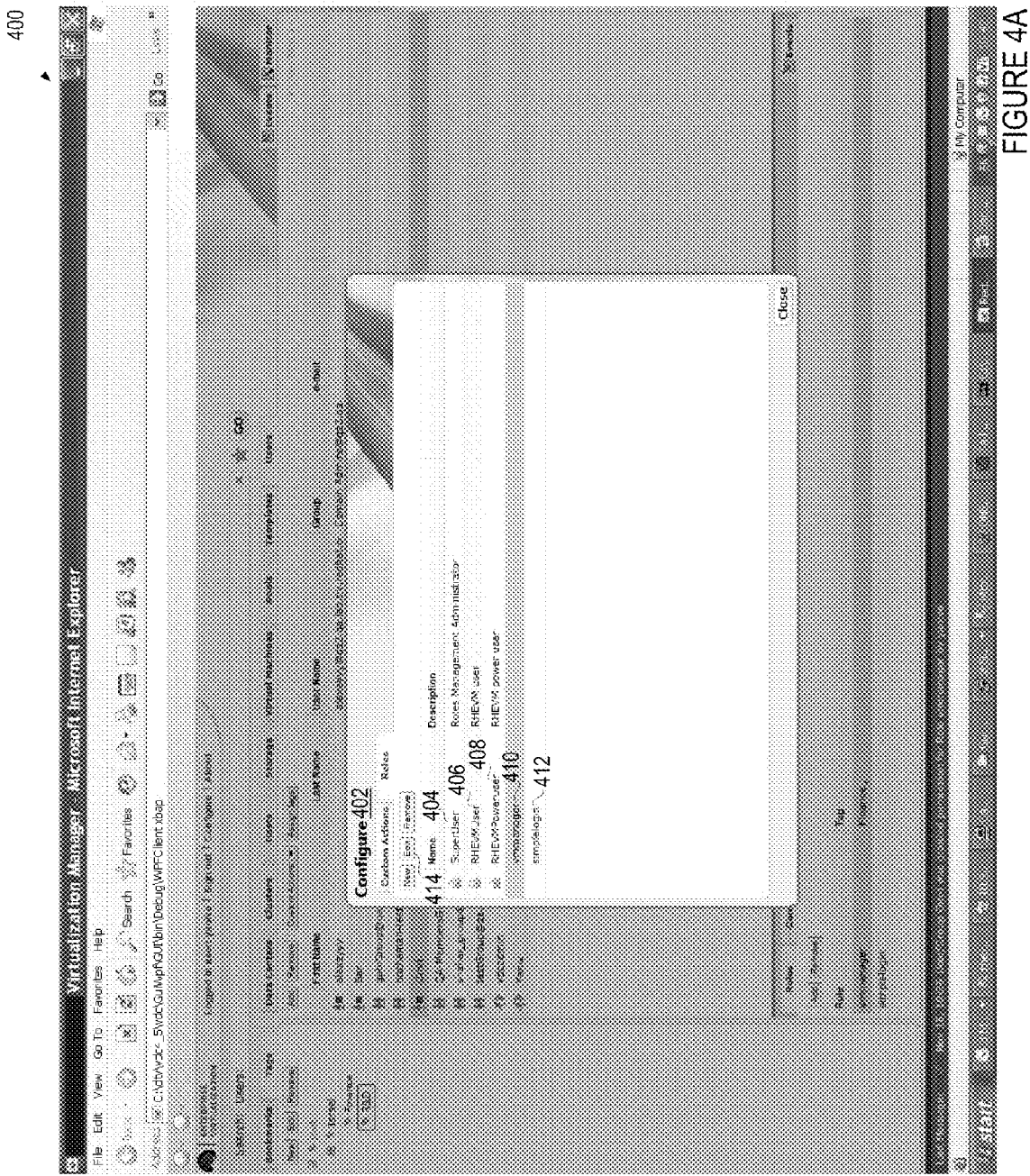
FIG. 4A illustrates an example user interface facilitating control of permissions in a virtualization environment, in accordance with some embodiments of the invention.
Figure 4B:
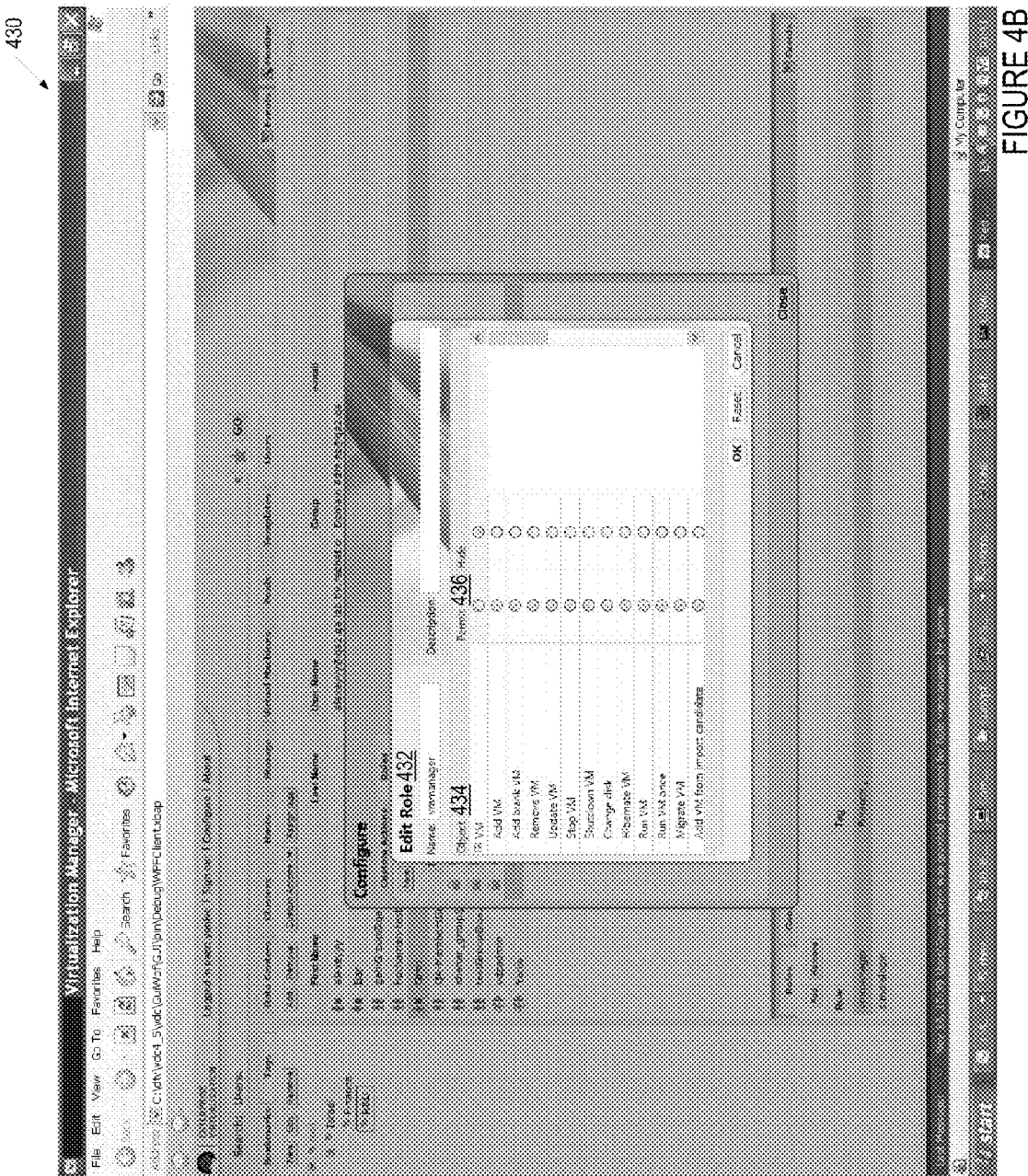
FIG. 4B illustrates an example user interface facilitating control of permissions in a virtualization environment, in accordance with some embodiments of the invention.

The user interface module 206 may also provide a roles user interface that receives user input identifying various user roles (e.g., IT director, system administrator, virtual machine manager, end user, etc.) and actions permitted for each user role. Information identifying the user roles and corresponding permitted actions is stored in the management database 204 (e.g., in a role table 214). An exemplary roles user interface will be discussed in more detail below in conjunction with FIGS. 4A and 4B.

The user interface module 206 may further provide a permissions user interface that receives user input assigning roles to specific users and/or groups of users and user input associating users and/or groups of users with labels. Associations of users and/or groups of users with corresponding roles and labels are stored in the management database 204 (e.g., in a user permission table 212). In one embodiment, if a user is part of one or more group, the user has the same roles and labels as those associated with the user's group(s). In addition to group permissions, the user may have individual permissions based on roles and labels assigned to this specific user.

An exemplary permissions user interface will be discussed in more detail below in conjunction with FIGS. 5A and 5B.

The label manager 208 handles user requests pertaining to labels. For example, a system administrator may need to know parameters of a specific virtual machine, or virtual machines that have one or more parameters in common. Upon receiving a system administrator request, the label manager 208 searches the management database 204 (e.g., the label table 210) and retrieves the requested information.

The permission manager 216 controls user actions pertaining to virtual machines. In particular, the permission manager 216 receives a user request to perform a certain action concerning a virtual machine (e.g., modify a virtual machine or delete a virtual machine), determines the role of the user (and/or the role associated with the user's group) and whether the requested action is permitted for this role or roles, and then determines whether the user (and/or the user's group) is associated with any of the labels assigned to the virtual machine specified in the request. If either of the above determinations is negative, the permission manager 216 denies the user request. Otherwise, if both determinations are positive, the permission manager 216 allows the requested action to proceed.

Figure 3:
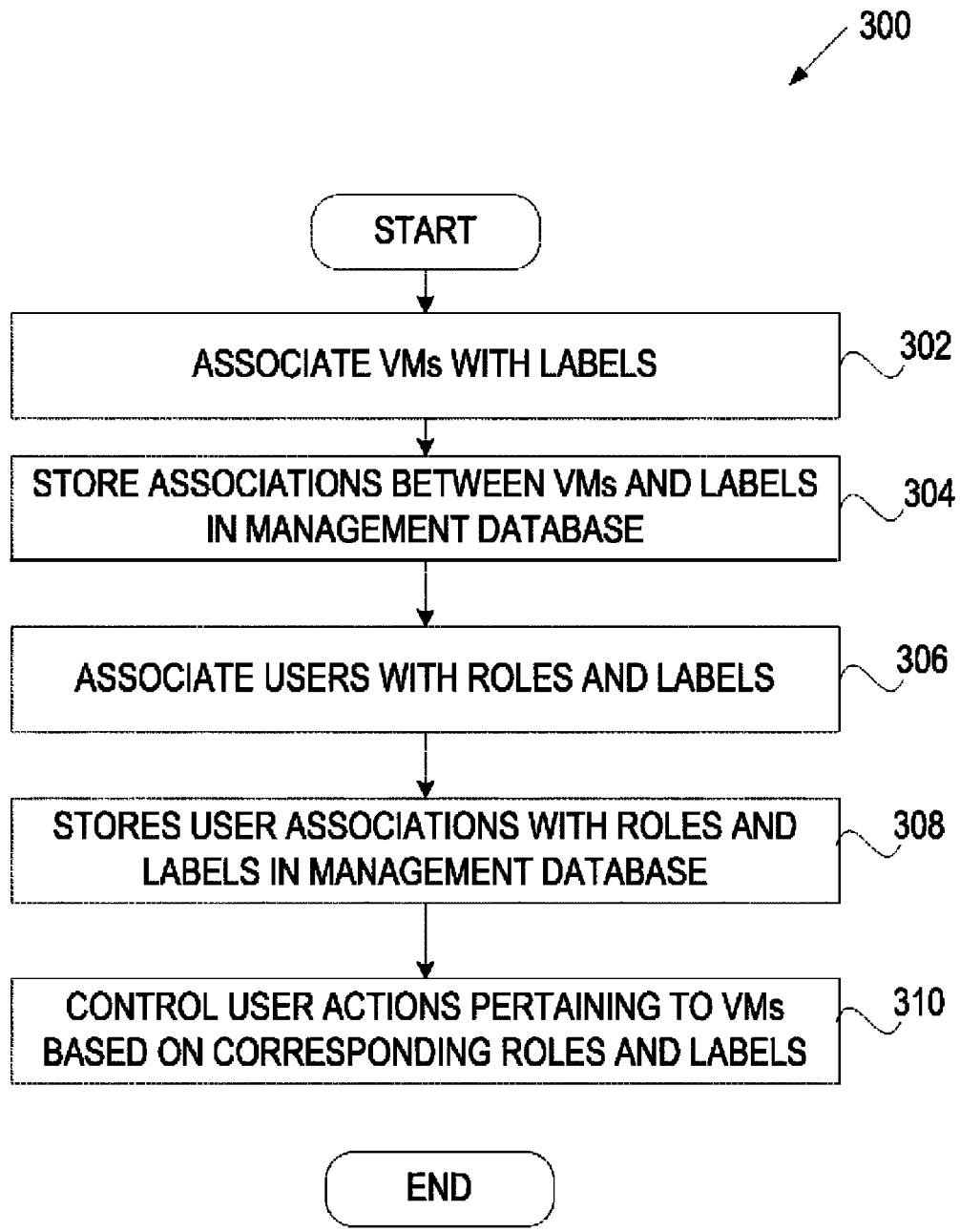
FIG. 3 is a flow diagram of one embodiment of a method for facilitating control of permissions in a virtualization environment using hierarchical labeling.

FIG. 3 is a flow diagram illustrating one embodiment of a method 300 for facilitating control of permissions in a virtualization environment using hierarchical labeling. The method 300 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a host controller (e.g., host controller 107 of FIG. 1).

Referring to FIG. 3, method 300 begins with associating virtual machines with labels (block 302). In one embodiment, the associations are performed based on user input. Alternatively, processing logic may associate a label with a virtual machine automatically upon detecting a certain event (e.g., when a user of a virtual machine moves to a new department within a company). At block 304, processing logic stores the labels in association with respective virtual machines in a database.

At block 306, processing logic associates users and/or groups of users with roles and virtual machine labels. In one embodiment, the associations are performed based on user input. Alternatively, processing logic may associate a user with a role and/or a label automatically upon detecting a certain event (e.g., when a user's title changes, when a user moves to an office in a different location, etc.). At block 308, processing logic stores user identifiers and/or user group identifiers in association with respective roles and labels in a database.

At block 310, processing logic controls user actions pertaining to virtual machines based on corresponding user roles and labels. In particular, for each user request to perform a certain action concerning a virtual machine (e.g., modify a virtual machine or delete a virtual machine), processing logic determines the roles of the user and the labels assigned to the user, and decides whether to allow the requested action based on the corresponding roles and labels. In some embodiments, this determination is performed using roles and labels associated with the user. In other embodiments, this determination is performed using roles and labels associated with the user's group(s). In yet other embodiments, the determination is performed by combining roles and labels associated with the user's group(s) with roles and labels associated with the user individually.

FIGS. 4 and 5 illustrate exemplary user interfaces facilitating control of permissions in a virtualization environment, in accordance with some embodiments of the invention. Referring to FIG. 4A, an exemplary roles user interface is provided. In particular, a virtualization manager GUI 400 includes a configure window 402 that lists available user roles 404, 406, 408, 410 and 412. Roles 404, 406 and 408 are predefined as shown by a lock icon, and roles 410 and 412 are custom roles added by a specific user (e.g., a role management administrator). Upon selecting a specific role (e.g., role 410), a user can activate an edit button 414 to specify, view or modify actions permitted for this role. In response to the activation of the edit button 414, GUI 430 of FIG. 4B is displayed.

GUI 430 includes an edit role window 432 listing actions 434 that can be performed with respect to virtual machines. For each listed action 434, an indicator (e.g., check box) 436 shows whether the action is permitted for the selected role or not. A role management administrator can change permissions associated with VM manager role 410 using relevant indicators 436. In another example (not shown), permitted actions for simplelogin role 412 are limited to viewing the operation of VMs on a specific site without permission to add/delete/modify any VMs.

Figure 4C:
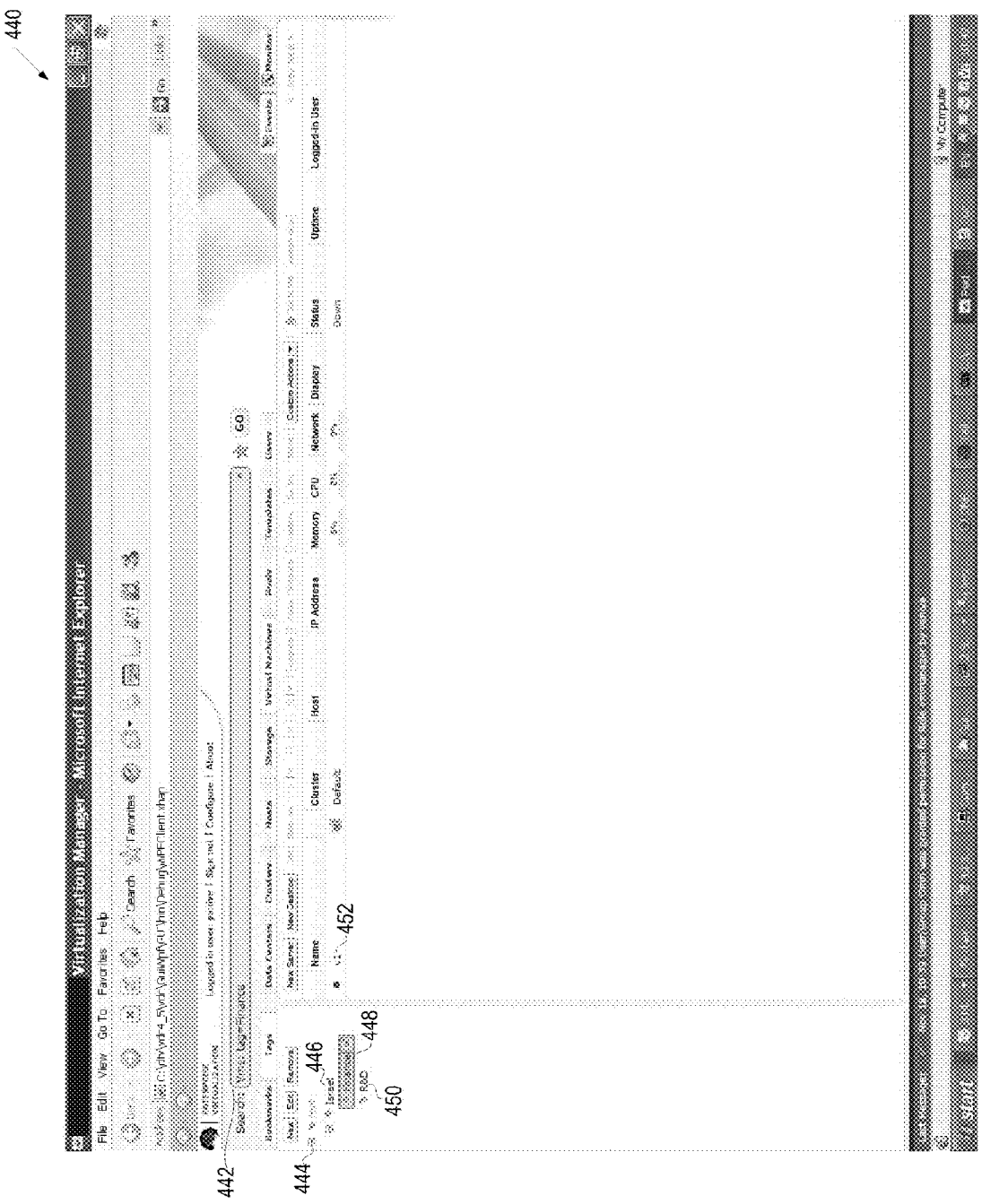
FIG. 4C illustrates an example user interface facilitating control of permissions in a virtualization environment, in accordance with some embodiments of the invention.
Figure 4D:
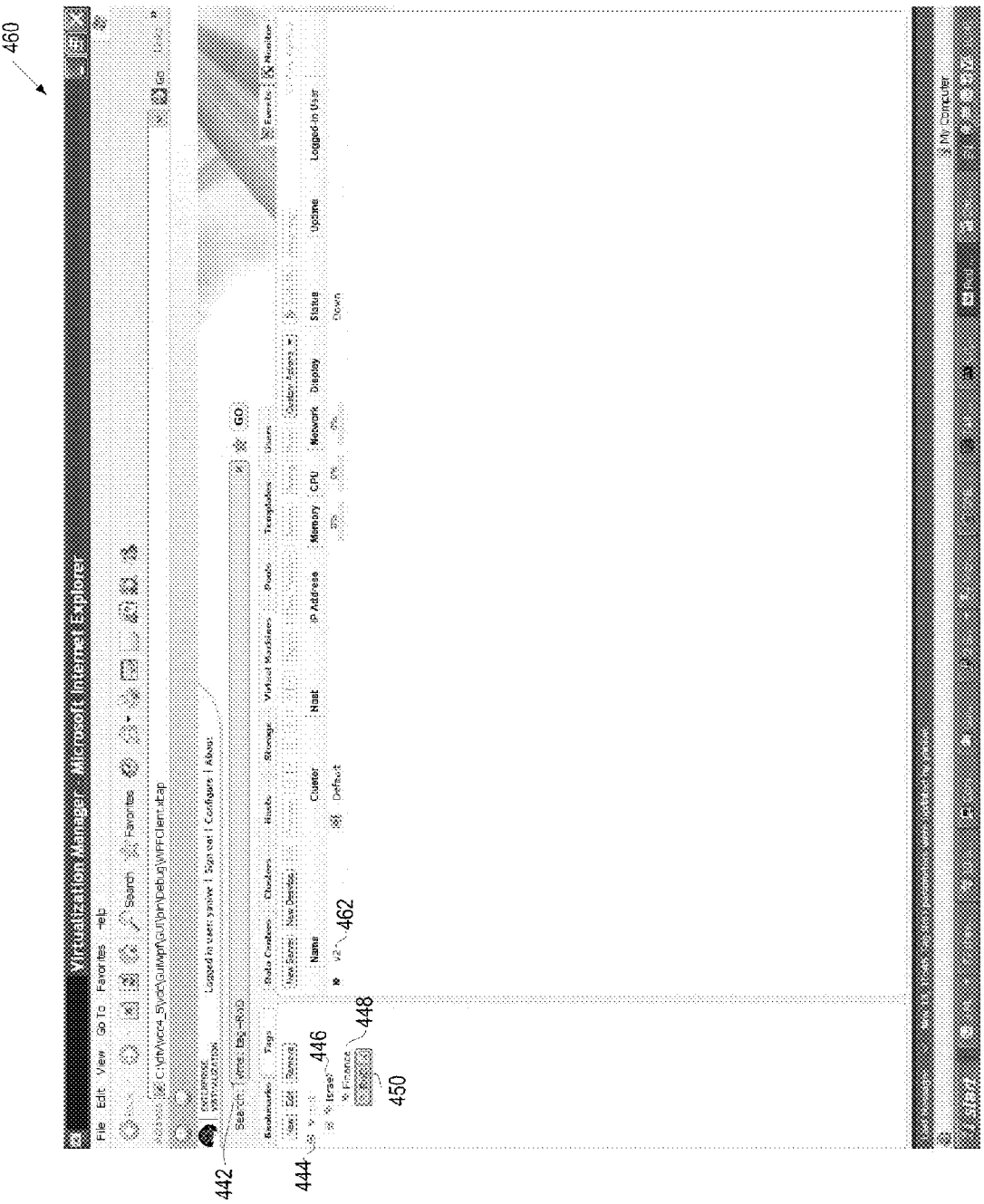
FIG. 4D illustrates an example user interface facilitating control of permissions in a virtualization environment, in accordance with some embodiments of the invention.

Referring to FIGS. 4C and 4D, labels GUIs 440 and 460 are displayed in response to a request 442. GUIs 440 and 460 show a label hierarchy 444 including Israel label 446 and its children Finance 448 and R&D 450. GUI 440 shows virtual machine 452 associated with label 448, and GUI 460 shows virtual machine 462 associated with label 450. When label 446 is selected (not shown), all VMs of its children labels 448 and 450 are presented.

Figure 5A:
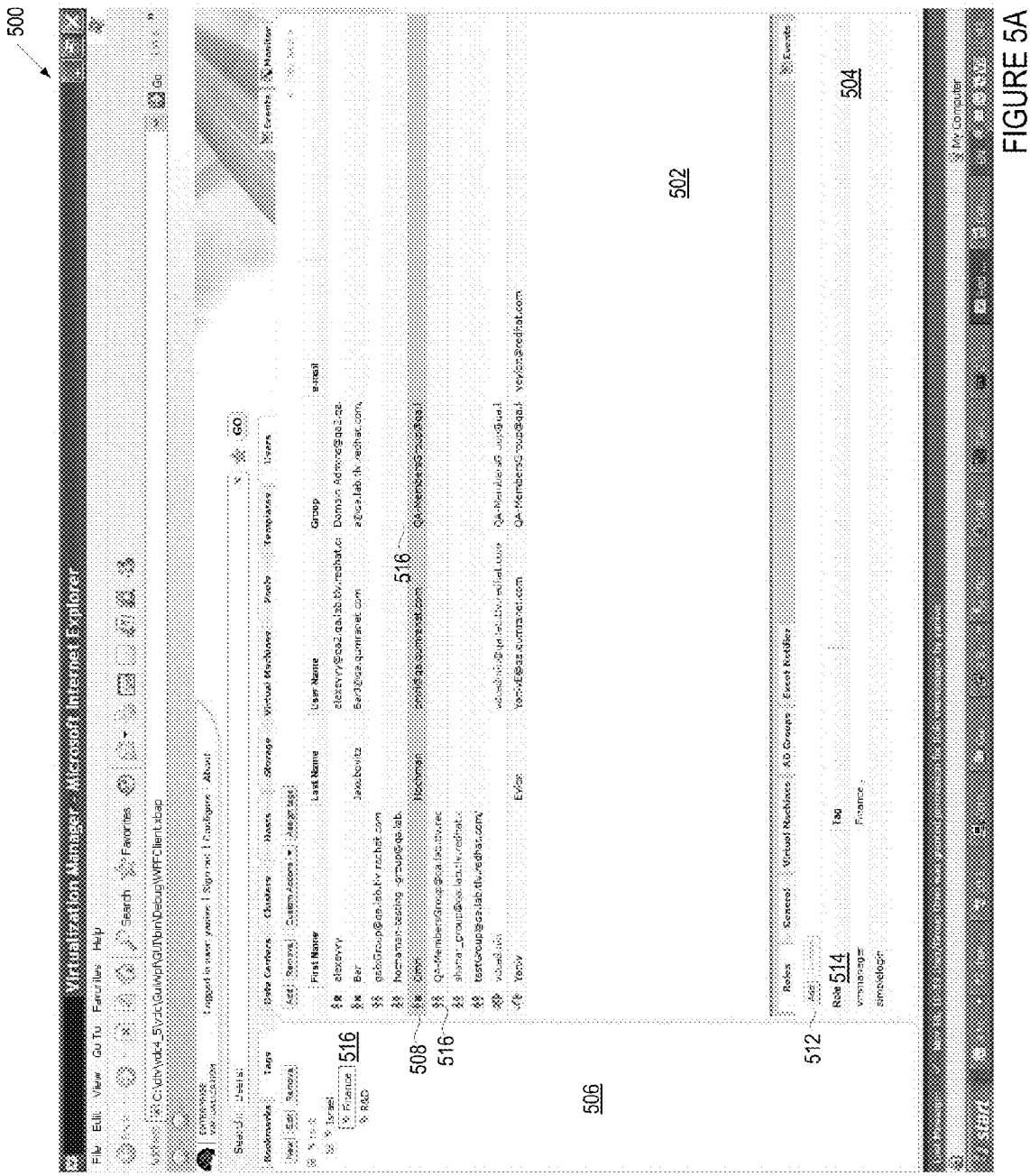
FIG. 5A illustrates an example user interface facilitating control of permissions in a virtualization environment, in accordance with some embodiments of the invention.

Referring to FIG. 5A, a permissions GUI 500 includes area 506 representing the label hierarchy, area 502 representing users and groups of users, and area 504 representing roles. Upon selection of user 508, label 516 associated with user 508 is highlighted. A user (e.g., a roles management administrator) can assign roles to user 508 by providing desired roles 514 and activating add button 512. User 508 will then be able to perform actions permitted for roles 514 with respect to VMs having label 516. In addition, user 508 is part of group 516, which may have different permissions than those assigned to user 508 individually. In one embodiment, user 508 has a combination of permissions—permissions assigned to user 508 individually and permissions assigned to group 516 to which user 408 belongs. In another embodiment, individually permissions may override group permissions or vice versa.

Figure 5B:
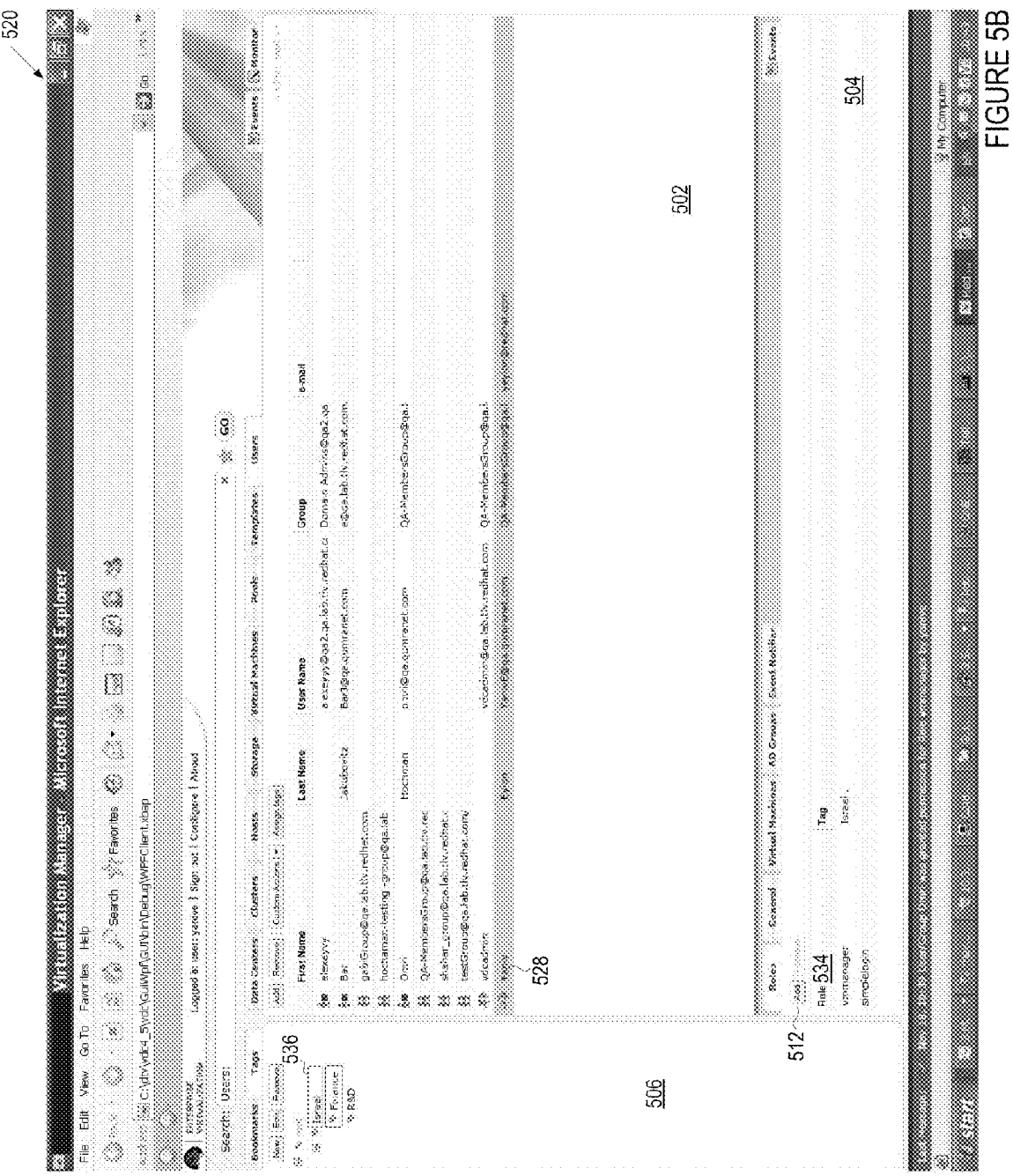
FIG. 5B illustrates an example user interface facilitating control of permissions in a virtualization environment, in accordance with some embodiments of the invention.

Referring to FIG. 5B, GUI 520 shows selection of user 528 associated with label 536. A user (e.g., a roles management administrator) can assign roles to user 528 by listing desired roles 534 and activating add button 512. User 528 will then be able to perform actions permitted for roles 534 with respect to all VMs having labels that are children of label 536. As discussed above, in some embodiments, user 528 also has permissions associated with the group to which user 528 belongs.

Figure 6:
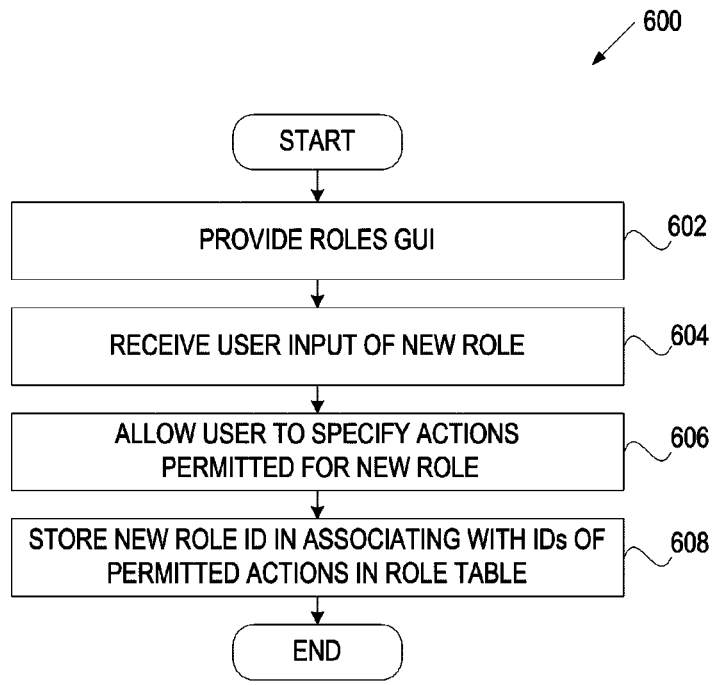
FIG. 6 is a flow diagram of one embodiment of a method for setting user roles in a virtualization environment.

FIG. 6 is a flow diagram of one embodiment of a method 600 for setting user roles in a virtualization environment. The method 600 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 600 is performed by a host controller (e.g., host controller 107 of FIG. 1).

Referring to FIG. 6, method 600 begins with providing a roles GUI (block 602). At block 604, processing logic receives user (e.g., role management administrator) input of a new role via the rules GUI. At block 606, processing logic allows a user to specify actions permitted for the new role via the rules GUI. At block 608, processing logic stores the new role identifier in association with identifiers of permitted actions in a role table.

Figure 7:
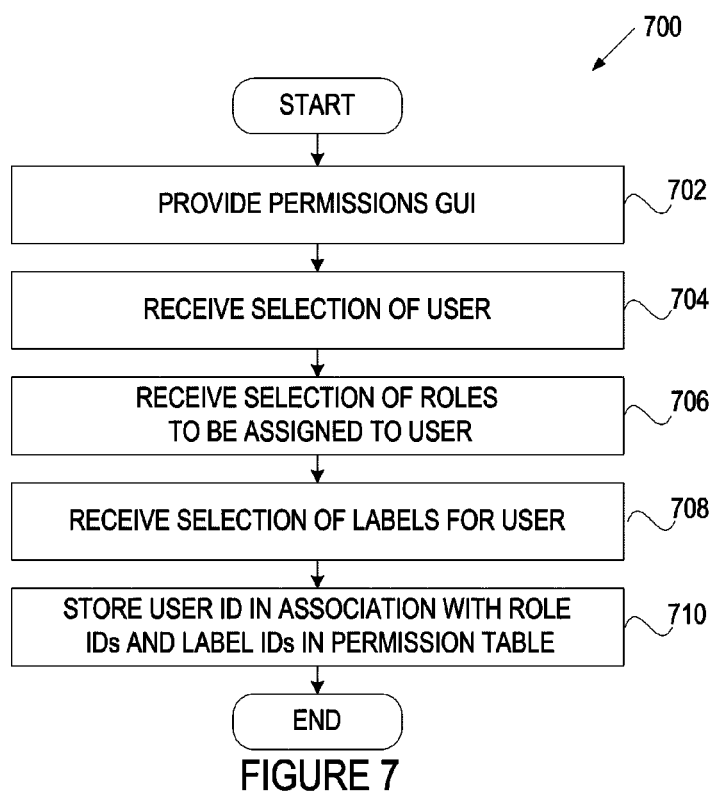
FIG. 7 is a flow diagram of one embodiment of a method for setting permissions for users in a virtualization environment.

FIG. 7 is a flow diagram of one embodiment of a method 700 for setting permissions for users in a virtualization environment. The method 700 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a host controller (e.g., host controller 107 of FIG. 1).

Referring to FIG. 7, method 700 begins with providing a permissions GUI (block 702). At block 704, processing logic receives a selection of a user (e.g., by a roles management administrator) or a user group via the permissions GUI. At block 706, processing logic receives selection of roles to be assigned to the user or the user group (e.g., by a roles management administrator) via the permissions GUI. At block 708, processing logic receives selection of labels for the user or the user group (e.g., by a roles management administrator) via the permissions GUI. At block 410, processing logic stores the user identifier or the user group identifier in association with the identifiers of the selected roles and labels in the permission table.

Figure 8:
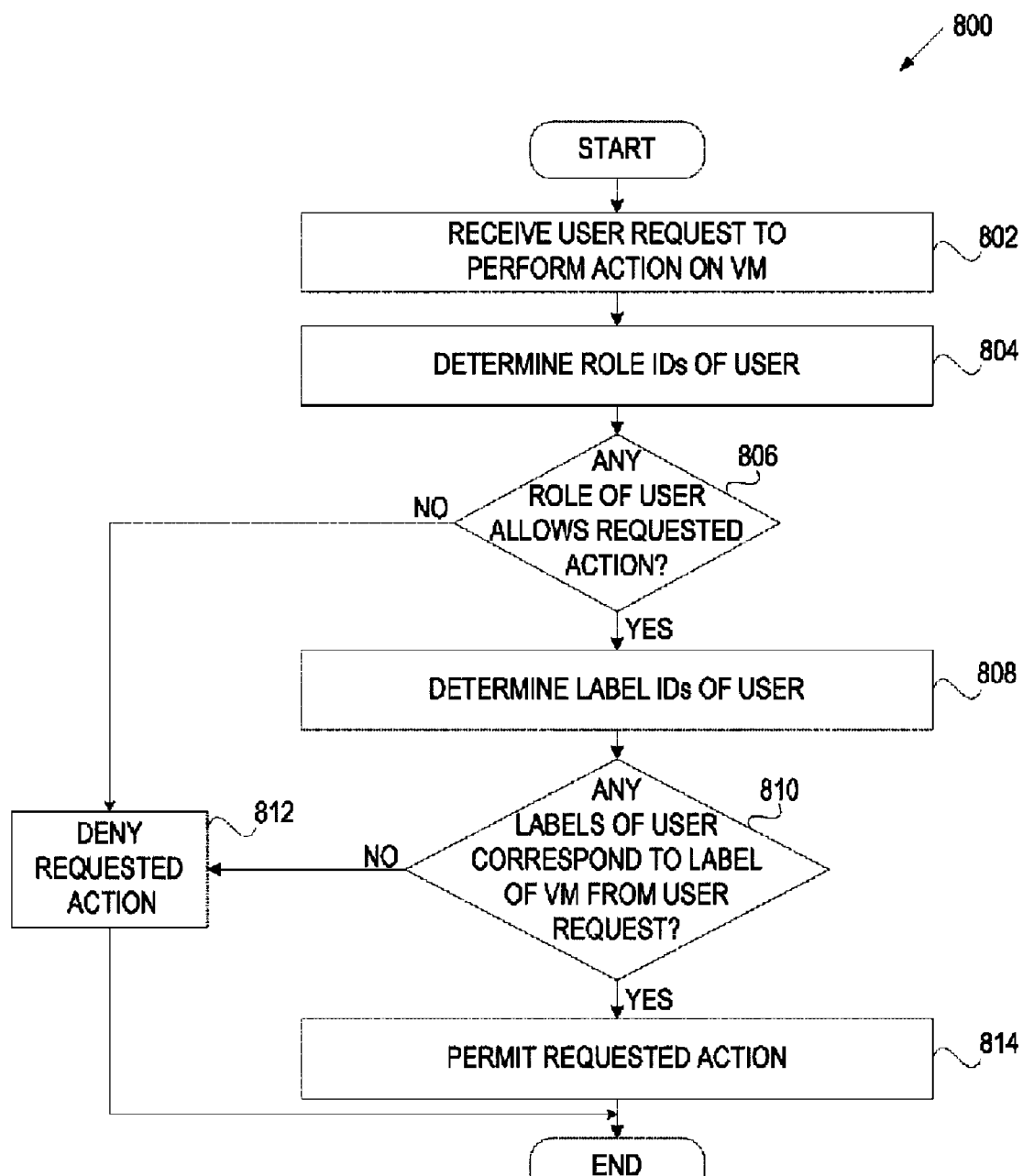
FIG. 8 is a flow diagram of one embodiment of a method for controlling user actions with respect to virtual machines.

FIG. 8 is a flow diagram of one embodiment of a method 800 for controlling user actions with respect to virtual machines. The method 800 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 800 is performed by a host controller (e.g., host controller 107 of FIG. 1).

Referring to FIG. 8, method 800 begins with receiving a user request to perform an action on a specific VM (block 802). At block 804, processing logic determines roles of the user issuing the request. In one embodiment, the roles of the users are roles assigned to the user individually. In another embodiment, the roles of the user are roles assigned to the group(s) to which the user belongs. In yet another embodiment, the roles of the user are a combination of roles assigned to the user individually and roles assigned to the group(s) to which the user belongs.

At block 806, processing logic determines whether any role of the user allows the requested action. If not, processing logic denies the requested action (block 812) and method 800 ends. If so, processing logic determines labels associated with the user and/or the user group(s) (block 808) and further determines whether any labels associated with the user and/or the user group(s) match the label of the VM specified in the user request. If at least one label associated with the user and/or the user group(s) matches the label of the specified VM or has a child label matching the label of the specified VM, processing logic permits the requested action (block 814). If no match is found, processing logic denies the requested action (block 812).

Figure 9:
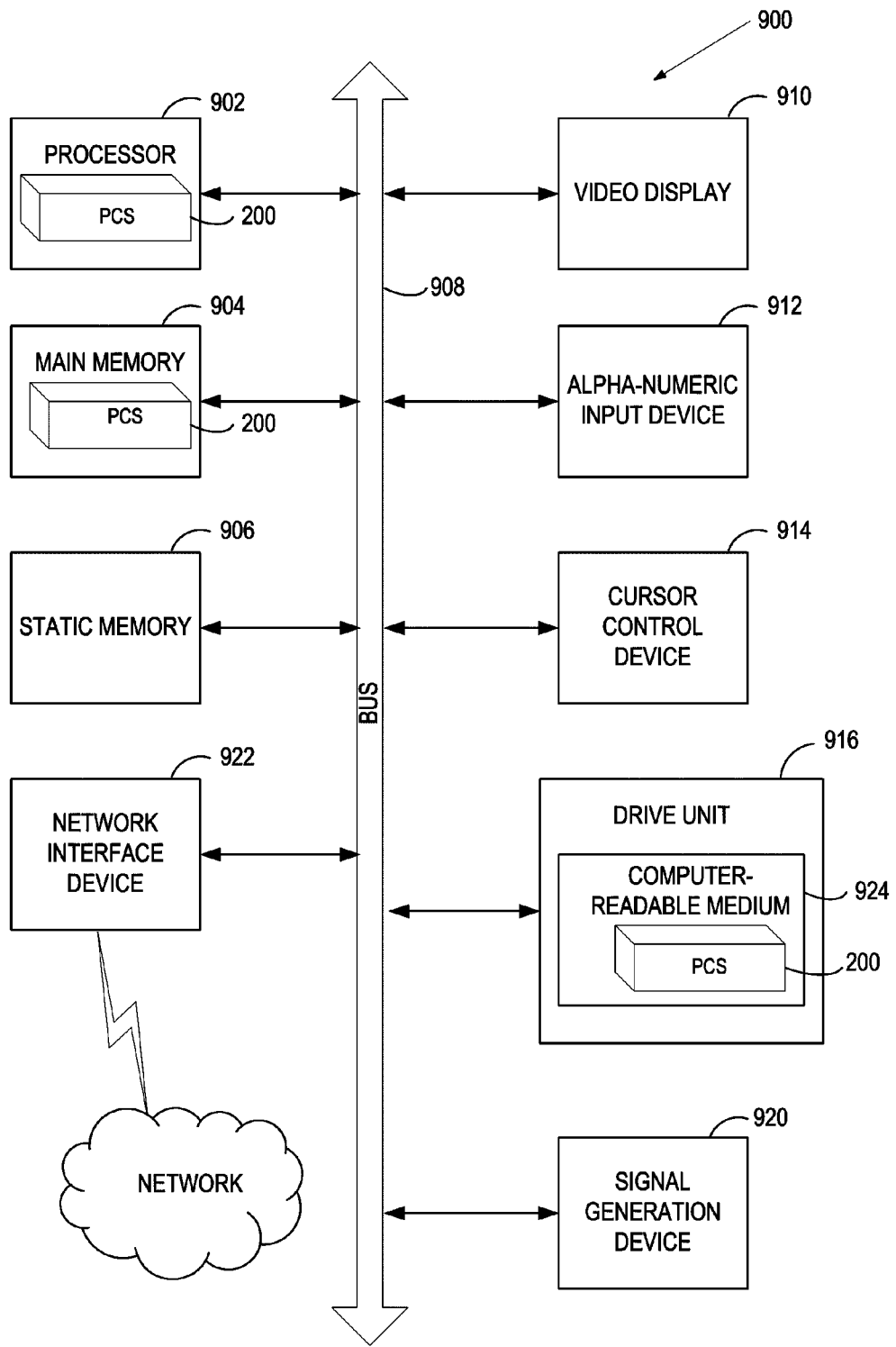
FIG. 9 illustrates a diagrammatic representation of a machine in the exemplary form of a computer system, in accordance with one embodiment of the present invention.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 900 includes a processor 902, a main memory 904 (e.g., read-only memory (ROM), flash memory, dynamic random access memory (DRAM) such as synchronous DRAM (SDRAM), etc.), a static memory 906 (e.g., flash memory, static random access memory (SRAM), etc.), and a secondary memory 918 (e.g., a data storage device), which communicate with each other via a bus 930.

The processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute processing logic of permission control system (PCS) 200 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The secondary memory 918 may include a machine-readable storage medium (or more specifically a computer-readable storage medium) 931 on which is stored one or more sets of instructions (e.g., of PCS 200) embodying any one or more of the methodologies or functions described herein. The PCS 200 may also reside, completely or at least partially, within the main memory 904 and/or within the processing device 902 during execution thereof by the computer system 900, the main memory 904 and the processing device 902 also constituting machine-readable storage media. The PCS 200 may further be transmitted or received over a network 920 via the network interface device 908.

The machine-readable storage medium 931 may also be used to store the virtualization manager 109 of FIG. 1. While the machine-readable storage medium 931 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "storing", "associating", "facilitating", "assigning", "receiving", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method comprising:
    associating, by a host controller, a plurality of virtual machines with labels from a hierarchy of labels in a first data structure using virtual machine identifiers and label identifiers, each of the labels representing a distinct virtual machine parameter;
    associating, in a second data structure, a plurality of roles with a plurality of actions permitted to be performed with respect to the plurality of virtual machines;
    associating, by the host controller, a plurality of users with the plurality of roles and with the labels from the hierarchy of labels in a third data structure using user identifiers, role identifiers and the label identifiers, each of the plurality of roles defining at least one of the plurality of actions permitted to be performed with respect to the plurality of virtual machines; and
    upon receiving a request of a user of the plurality of users to perform an action with respect to a virtual machine of the plurality of virtual machines,
    determining, using the first data structure, one or more label identifiers associated with the virtual machine;
    determining, using the second data structure, one or more roles permitting the requested action;
    determining, using the third data structure, whether a user identifier of the user is associated with at least one of the determined label identifiers and at least one of the determined roles; and
    when the user identifier is associated with at least one of the determined label identifiers and at least one of the determined roles, determining that the user is permitted to perform the requested action with respect to the virtual machine.

2. The method of claim 1 wherein the at least one action comprises one or more of viewing virtual machines, adding a virtual machine, removing a virtual machine, updating a virtual machine, stopping a virtual machine, shutting down a virtual machine, changing a disk for a virtual machine, hibernating a virtual machine, running a virtual machine, migrating a virtual machine, managing the hierarchy of labels, or managing the plurality of roles.

3. The method of claim 1 wherein the third data structure is a user permission table of a database, and wherein associating the plurality of users with the plurality of roles and with the labels from the hierarchy of labels comprises:
   storing information concerning the plurality of roles in the database;
   assigning the plurality of roles to the plurality of users;
   assigning one or more labels from the hierarchy to each of the plurality of users; and
   storing user identifiers in association with corresponding role identifiers and corresponding label identifiers in the user permission table of the database.

4. The method of claim 3 wherein storing information concerning the plurality of roles in the user permission table of the database comprises:
   providing a role configuration user interface;
   receiving, via the role configuration user interface, user input specifying a new role;
   receiving, via the role configuration user interface, user input specifying one or more actions permitted for the new role; and
   storing an identifier of the new role in association with identifiers of the permitted actions in a role table of the database, the role table representing the second data structure.

5. The method of claim 3 wherein assigning the plurality of roles to the plurality of users comprises:
   providing a role assignment user interface;
   receiving, via the role assignment user interface, a selection of one of the plurality of users; and
   receiving, via the role assignment user interface, user input specifying one or more roles to be added for the user.

6. The method of claim 3 wherein assigning one or more labels from the hierarchy to each of the plurality of users comprises:
   receiving, via a role assignment user interface, a selection of one of the plurality of users; and
   receiving, via the role assignment user interface, user input specifying one or more labels to be added for the user.

7. The method of claim 1, wherein the distinct virtual machine parameter is any one of an organization division characteristic, a geographic location characteristic, or a technical characteristic.

8. The method of claim 1, wherein the hierarchy of labels is a tree having a plurality of nodes representing labels and a plurality of edges representing relationships between the labels.

9. The method of claim 1 wherein:
   the user is part of at least one group, each group being associated one or more roles and one or more labels; and
   the method further comprises facilitating control over user actions based on the one or more roles and the one or more labels associated with the user, and the one or more roles and the one or more labels associated with the at least one group of the user.

10. A system comprising:
   a data storage device having a database to associate virtual machines with labels from a hierarchy of labels in a first data structure using virtual machine identifiers and label identifiers, each of the labels representing a distinct virtual machine parameter, and to associate, in a second data structure, a plurality of roles with a plurality of actions permitted to be performed with respect to the plurality of virtual machines; and
   a processing device, coupled with the data storage device, to associate a plurality of users with the plurality of roles and with the labels from the hierarchy of labels in a third data structure using user identifiers, role identifiers and the label identifiers, each of the plurality of roles defining at least one of the plurality of actions permitted to be performed with respect to the plurality of virtual machines, and
   upon receiving a request of a user of the plurality of users to perform an action with respect to a virtual machine of the plurality of virtual machines:
      to determine, using the first data structure, one or more label identifiers associated with the virtual machine;
      to determine, using the second data structure, one or more roles permitting the requested action;
      to determine, using the third data structure, whether a user identifier of the user is associated with at least one of the determined label identifiers and at least one of the determined roles; and
   when the user identifier is associated with at least one of the determined label identifiers and at least one of the determined roles, to determine that the user is permitted to perform the requested action with respect to the virtual machine.

11. The system of claim 10 wherein the at least one action comprises one or more of viewing virtual machines, adding a virtual machine, removing a virtual machine, updating a virtual machine, stopping a virtual machine, shutting down a virtual machine, changing a disk for a virtual machine, hibernating a virtual machine, running a virtual machine, migrating a virtual machine, managing the hierarchy of labels, or managing the plurality of roles.

12. The system of claim 10 wherein the third data structure is a user permission table of the database, and wherein the processing device is to associate the plurality of users with the plurality of roles and with the labels from the hierarchy of labels by:
   storing information concerning the plurality of roles in the database;
   assigning the plurality of roles to the plurality of users;
   assigning one or more labels from the hierarchy to each of the plurality of users; and
storing user identifiers in association with corresponding role identifiers and corresponding label identifiers in the user permission table of the database.

13. The system of claim 10, wherein the distinct virtual machine parameter is any one of an organization division characteristic, a geographic location characteristic, or a technical characteristic.

14. The system of claim 10 wherein:
   the user is part of at least one group, each group being associated with one or more roles and one or more labels; and
the processing device is further to facilitate control over user actions based on the one or more roles and the one or more labels associated with the user, and the one or more roles and the one or more labels associated with the at least one group of the user.

15. A non-transitory computer readable storage medium including instructions that, when executed by a processing system, cause the processing system to perform a method comprising:
   associating, by a host controller, a plurality of virtual machines with labels from a hierarchy of labels in a first data structure using virtual machine identifiers and label identifiers, each of the labels representing a distinct virtual machine parameter;
   associating, in a second data structure, a plurality of roles with a plurality of actions permitted to be performed with respect to the plurality of virtual machines;
   associating, by the host controller, a plurality of users with the plurality of roles and with the labels from the hierarchy of labels in a third data structure using user identifiers, role identifiers and the label identifiers, each of the plurality of roles defining at least one of the plurality of actions permitted to be performed with respect to the plurality of virtual machines; and upon receiving a request of a user of the plurality of users to perform an action with respect to a virtual machine of the plurality of virtual machines, determining, using the first data structure, one or more label identifiers associated with the virtual machine;

determining, using the second data structure, one or more roles permitting the requested action;

determining, using the third data structure, whether a user identifier of the user is associated with at least one of the determined label identifiers and at least one of the determined roles; and when the user identifier is associated with at least one of the determined label identifiers and at least one of the determined roles, determining that the user is permitted to perform the requested action with respect to the virtual machine.

16. The computer readable storage medium of claim 15 wherein the at least one action comprises one or more of viewing virtual machines, adding a virtual machine, removing a virtual machine, updating a virtual machine, stopping a virtual machine, shutting down a virtual machine, changing a disk for a virtual machine, hibernating a virtual machine, running a virtual machine, migrating a virtual machine, managing the hierarchy of labels, or managing the plurality of roles.

17. The computer readable storage medium of claim 15 wherein the third data structure is a user permission table of a database, and wherein associating the plurality of users with the plurality of roles and with the labels from the hierarchy of labels comprises:

storing information concerning the plurality of roles in the database;

assigning the plurality of roles to the plurality of users;

assigning one or more labels from the hierarchy to each of the plurality of users; and storing user identifiers in association with corresponding role identifiers and corresponding label identifiers in the user permission table of the database.

18. The computer readable storage medium of claim 15 wherein:

the user is part of at least one group, each group being associated one or more roles and one or more labels; and the method further comprises facilitating control over user actions based on the one or more roles and the one or more labels associated with the user, and the one or more roles and the one or more labels associated with the at least one group of the user.

* * * * *